United States Patent
Nagahama et al.

(10) Patent No.: US 9,550,415 B2
(45) Date of Patent: Jan. 24, 2017

(54) VEHICLES INCORPORATING COOLING DRAG REDUCTION SYSTEMS AND METHODS

(71) Applicant: Toyota Motor Engineering & Manufacturing North America, Inc., Erlanger, KY (US)

(72) Inventors: Satoshi Nagahama, Ann Arbor, MI (US); Nic Evans, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 160 days.

(21) Appl. No.: 14/186,923

(22) Filed: Feb. 21, 2014

(65) Prior Publication Data
US 2015/0240700 A1 Aug. 27, 2015

(51) Int. Cl.
*B60K 11/00* (2006.01)
*B60K 11/08* (2006.01)
*F01P 5/04* (2006.01)

(52) U.S. Cl.
CPC .............. *B60K 11/08* (2013.01); *F01P 5/043* (2013.01)

(58) Field of Classification Search
None
See application file for complete search history.

(56) References Cited

U.S. PATENT DOCUMENTS

| | | | |
|---|---|---|---|
| 6,729,844 B2 | 5/2004 | Bettencourt | |
| 7,121,368 B2* | 10/2006 | MacKelvie | B60K 11/00 123/41.12 |
| 7,178,395 B2* | 2/2007 | Browne | B62D 35/005 244/201 |
| 7,216,923 B2* | 5/2007 | Wong | B62D 35/001 180/309 |
| 7,364,220 B2* | 4/2008 | Shahbazi | B62D 35/00 296/180.1 |
| 8,113,569 B2* | 2/2012 | Zhu | B61D 17/02 296/180.1 |
| 8,162,086 B2 | 4/2012 | Robinson | |
| 8,967,311 B2* | 3/2015 | Smith | B62D 35/001 180/309 |
| 2008/0150321 A1* | 6/2008 | Neale | B62D 35/00 296/180.1 |
| 2013/0140103 A1* | 6/2013 | Smith | B60K 11/06 180/309 |

FOREIGN PATENT DOCUMENTS

| | | |
|---|---|---|
| JP | H03104792 A | 5/1991 |
| JP | 2007182091 A | 7/2007 |
| JP | 2008106727 A | 5/2008 |

* cited by examiner

*Primary Examiner* — Katy M Ebner
(74) *Attorney, Agent, or Firm* — Dinsmore & Shohl LLP (57) ABSTRACT

A method for operating a cooling fan of a vehicle including detecting at least one of a battery charge of a battery of the vehicle and a state of engagement of an air conditioning system of the vehicle and rotating the cooling fan in a direction to expel air from an engine compartment of the vehicle based on at least one of a detected battery charge of the battery or a detected state of engagement of the air conditioning system.

18 Claims, 7 Drawing Sheets

VEHICLES INCORPORATING COOLING DRAG REDUCTION SYSTEMS AND METHODS

TECHNICAL FIELD

The present specification generally relates to systems and methods for reducing cooling drag on a vehicle and, more specifically, to systems and methods for selectively rotating a cooling fan of the vehicle to reduce cooling drag.

BACKGROUND

Aerodynamic drag on motor vehicles has an effect on the fuel economy of the vehicle and the carbon footprint of the vehicle. As consumer demand for improved fuel economy has increased, methods and structures for reducing aerodynamic drag on motor vehicles have been sought. Cooling drag is a significant factor in the overall aerodynamic drag on the vehicle. Cooling drag is a result of air entering a front facie of the vehicle and impinging against components within an engine compartment of the vehicle, imparting a force on the vehicle opposite to the direction of travel. The effects of cooling drag are more pronounced at higher vehicle speeds, such as during highway travel, and may significantly decrease fuel economy.

Accordingly, a need exists for alternative systems and methods for reducing cooling drag on a vehicle.

SUMMARY

In one embodiment, a method for operating a cooling fan of a vehicle may include detecting at least one of a battery charge of a battery of the vehicle and a state of engagement of an air conditioning system of the vehicle; and rotating the cooling fan in a direction to expel air from an engine compartment of the vehicle based on at least one of a detected battery charge of the battery or a detected state of engagement of the air conditioning system.

In another embodiment, a cooling drag reduction system for a vehicle may include an electronic controller including a processor and a memory storing a computer readable and executable instruction set, a state of charge sensor communicatively coupled to the electronic controller, an air conditioning system communicatively coupled to the electronic controller, a cooling fan communicatively coupled to the electronic controller, where, when the computer readable and executable instruction set is executed by the processor, the electronic controller detects at least one of a battery charge of a battery of the vehicle with the state of charge sensor and a state of engagement of the air conditioning system of the vehicle and commands the cooling fan to rotate in a direction to expel air from an engine compartment of the vehicle based on at least one of a detected battery charge of the battery or a detected state of engagement of the air conditioning system.

In yet another embodiment, a vehicle may include an electronic controller including a processor and a memory storing a computer readable and executable instruction set, a state of charge sensor communicatively coupled to the electronic controller, an air conditioning system communicatively coupled to the electronic controller, a cooling fan communicatively coupled to the electronic controller, where, when the computer readable and executable instruction set is executed by the processor, the electronic controller detects at least one of a battery charge of a battery of the vehicle with the state of charge sensor and a state of engagement of the air conditioning system of the vehicle, and commands the cooling fan to rotate in a direction to expel air from an engine compartment of the vehicle based on at least one of a detected battery charge of the battery or a detected state of engagement of the air conditioning system.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
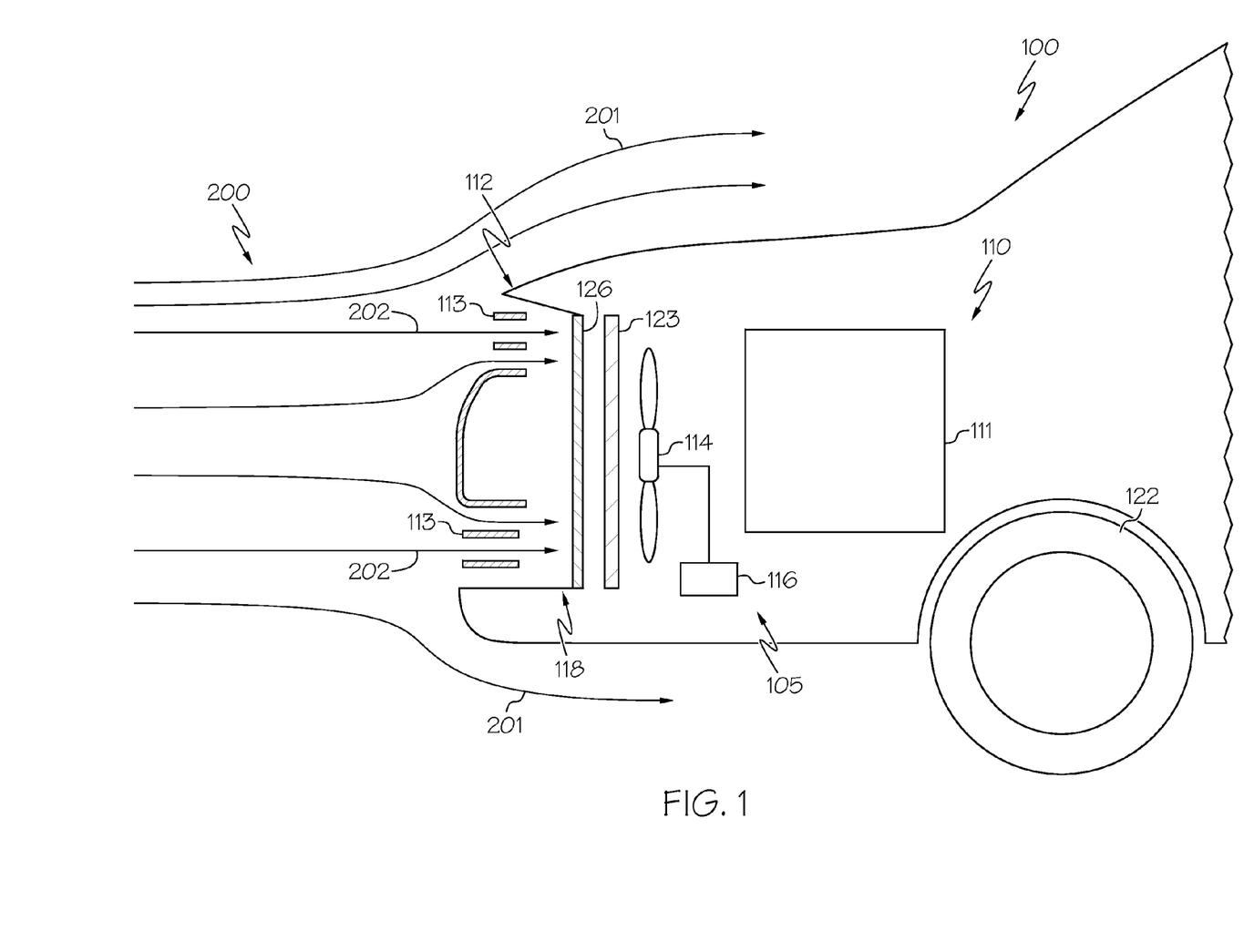
FIG. 1 depicts a schematic view of a vehicle with a cooling drag reduction system, according to one or more embodiments shown and described herein, with air entering the front facie and causing cooling drag (i.e., the cooling drag reduction system is not engaged)
Figure 2:
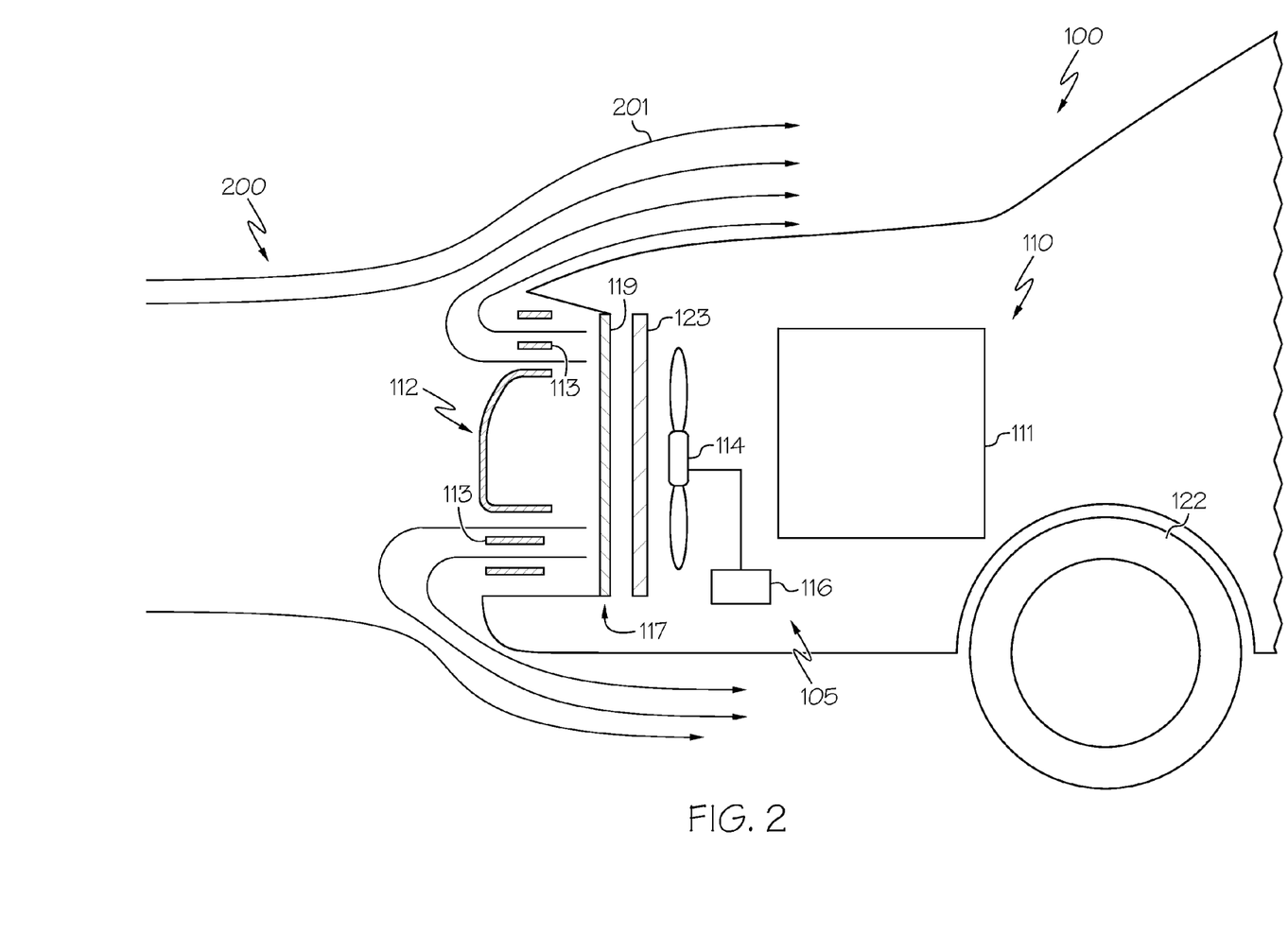
FIG. 2 depicts a schematic view of a vehicle with a cooling drag reduction system, according to one or more embodiments shown and described herein, expelling air from the engine compartment thereby reducing cooling drag on the vehicle.

Embodiments described herein relate to vehicles having cooling drag reduction systems for reducing the cooling drag on a vehicle, such as a system that selectively rotates a cooling fan in a direction to reduce the aerodynamic drag on a vehicle. Referring to FIGS. 1 and 2, one embodiment of a vehicle with a cooling drag reduction system is schematically depicted. The vehicle includes a cooling fan located in an engine compartment of the vehicle. An electronic control unit commands the cooling fan to rotate in a direction to draw air from outside the engine compartment in through the front facie, or to rotate in an opposite direction to expel air from the engine compartment out the front facie. The electronic control unit determines the direction of the cooling fan rotation based on one or more inputs. For example, the electronic control unit may receive electronic signals corresponding to the state of engagement of an air conditioning system of the vehicle, a battery charge of a battery of the vehicle, a vehicle speed, and an engine temperature of the vehicle. The electronic control unit determines the direction of rotation of the cooling fan based on one or more of the state of engagement of the air conditioning system, the battery charge of the battery, the vehicle speed, and the engine temperature. Rotating the cooling fan in a direction to expel air from the interior of the engine compartment of the vehicle reduces the influx of air into the engine compartment through the front facie of the vehicle, thereby reducing cooling drag on the vehicle. Embodiments of cooling drag reduction systems and methods of operating vehicles to reduce cooling drag will be described in more detail herein with specific reference to the appended drawings.

The phrase "communicatively coupled" is used herein to described the interconnectivity of various components of the cooling drag reduction system and means that the components are connected either through wires, optical fibers, or wirelessly such that electrical, optical, and/or electromagnetic signals may be exchanged between the components.

Figure 3:
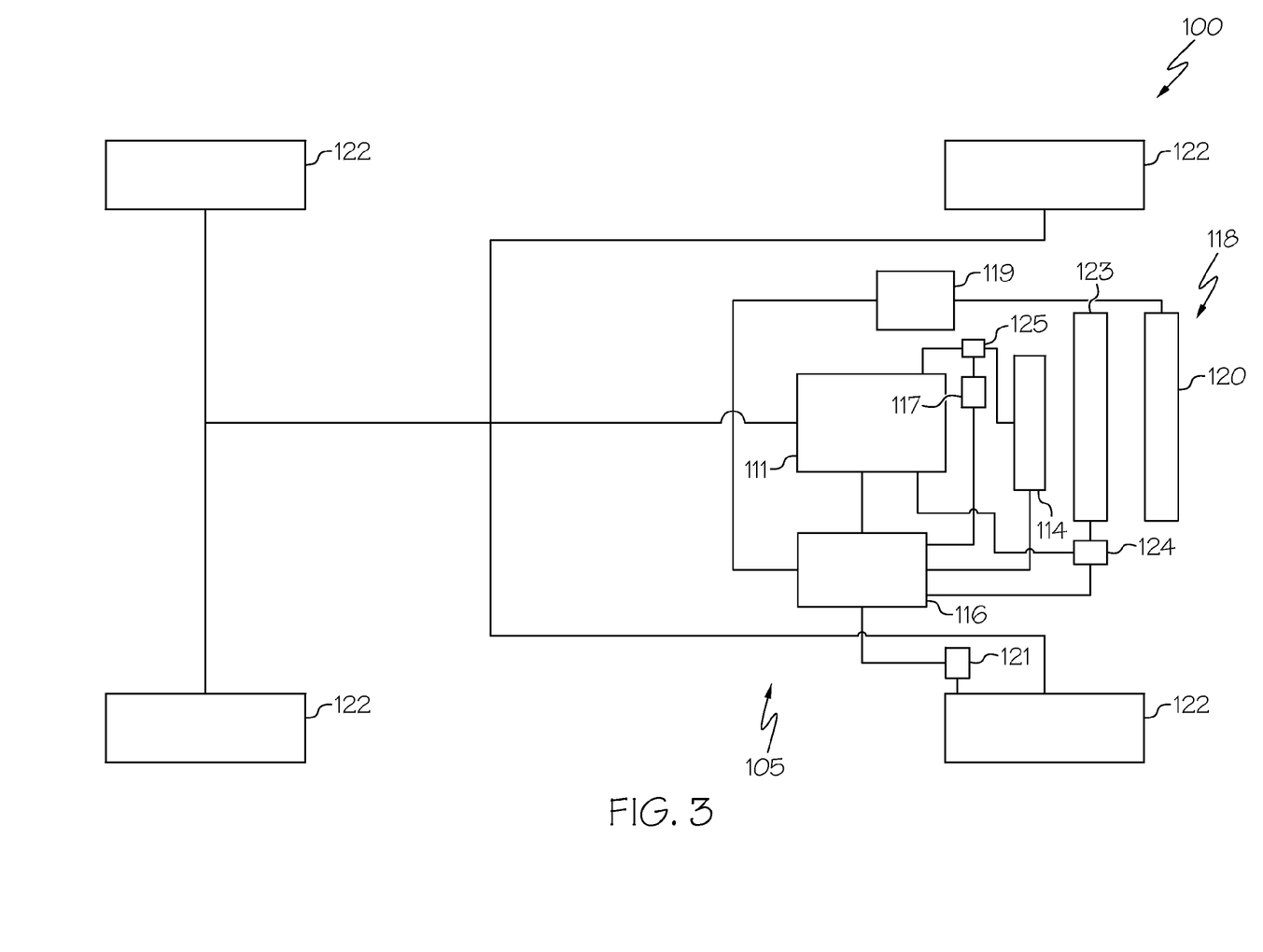
FIG. 3 is a block diagram of a cooling drag reduction system of a vehicle according, to one or more of the embodiments shown and described herein.

Referring now to FIGS. 1, 2, and 3, one embodiment of a vehicle 100 including a cooling drag reduction system 105 is depicted. The vehicle 100 includes an engine compartment 110, the engine compartment 110 housing a vehicle drive source 111. A front of the engine compartment 110 includes a front facie 112 through which air may enter the engine compartment 110. The front facie 112 may optionally include at least one front grille 113 positioned in or on the front facie 112 of the vehicle 100.

Referring now to FIG. 1, an air stream 200 is depicted flowing over the vehicle 100. The air stream 200 encounters the front facie 112 of the vehicle 100, where a first portion 201 of the air stream 200 continues to flow over the vehicle 100, and a second portion 202 of the air stream 200 flows through the at least one front grille 113 of the front facie 112 and into the engine compartment 110. The separation of the air stream 200, and the flow of the second portion 202 of the air stream 200 into the engine compartment contributes to the aerodynamic drag of the vehicle. Some of the aerodynamic drag on the vehicle 100 is caused by the separation of the air stream 200 into the first portion 201 flowing over the vehicle 100, and the second portion 202 of the air stream 200 flowing through the front facie 112. Additionally, some of the aerodynamic drag is caused as the second portion 202 of the air stream 200 collides with components in the engine compartment 110 of the vehicle 100. The aerodynamic drag caused by the separation of the air stream 200 and the collision of the second portion 202 of the air stream 200 with components in the engine compartment 110 is referred to as cooling drag.

To reduce cooling drag on the vehicle 100, a cooling fan 114 may be rotated in a direction to expel air from the engine compartment 110 out the front facie 112 of the vehicle 100, as schematically depicted in FIG. 2. The expulsion of air from the engine compartment 110 reduces the air flow from the second portion 202 of the air stream 200 entering the engine compartment 110. By reducing the air flow from the second portion 202 of the air stream 200 entering the engine compartment 110, more of the air stream 200 flows over the vehicle 100 as a part of the first portion 201 of the air stream. With more of the air stream 200 flowing over the vehicle 100, the amount of separation of the air stream 200 is reduced, reducing the amount of aerodynamic drag on the vehicle. Additionally, reducing the air flow from the second portion 202 of the air stream 200 entering the engine compartment 110 reduces the aerodynamic drag caused by the collision of the second portion 202 of the air stream 200 with components in the engine compartment 110. Accordingly, by rotating the cooling fan 114 in a direction to expel air from the engine compartment 110, the amount of cooling drag on a vehicle may be reduced.

Referring to FIGS. 2 and 3, in embodiments, the cooling drag reduction system 105 includes an electronic control unit 116, a cooling fan 114 communicatively coupled to the electronic control unit 116, a state of charge sensor 117 communicatively coupled to the electronic control unit 116, and an air conditioning system 118 communicatively coupled to the electronic control unit 116. In alternative embodiments, the cooling drag reduction system 105 may also optionally include a vehicle speed sensor 121 communicatively coupled to the electronic control unit 116, and an engine temperature sensor 124 communicatively coupled to the electronic control unit 116.

In the embodiments described herein, the cooling fan 114 is disposed within the engine compartment 110, behind the front facie 112. The cooling fan 114 is communicatively coupled to the electronic control unit 116, such that the cooling fan 114 receives signals, such as control signals, from the electronic control unit 116. These signals may be used to control the direction of rotation of the cooling fan 114 and/or prevent the rotation of the cooling fan 114. The cooling fan 114 may also send signals to the electronic control unit 116 including, for example, signals indicative of the direction of rotation of the cooling fan 114, the speed of the cooling fan 114, and the like.

The electronic control unit 116 includes a processor and a memory storing computer readable and executable instructions, which, when executed by the processor, facilitate operation of the cooling drag reduction system 105. In some embodiments, the electronic control unit 116 may be a standalone controller. In some other embodiments, the electronic control unit 116 may be an engine control unit (ECU), which is communicatively coupled to an internal combustion engine, such as when the vehicle drive source 111 includes an internal combustion engine. In embodiments where the electronic control unit 116 is an ECU, the electronic control unit 116 may be responsible for controlling functions of the internal combustion engine, such as fuel flow rate and ignition timing. In still other embodiments, the electronic control unit 116 may be a motor control unit communicatively coupled to an electric motor, such as when the vehicle drive source 111 includes an electric motor (i.e., when the vehicle 100 is an electric vehicle or a hybrid vehicle). In embodiments where the electronic control unit 116 is a motor control unit, the electronic control unit 116 may be responsible for controlling the electric motor, such as regulating the power supplied to the motor, regenerative breaking, and the like.

In the embodiment depicted in FIGS. 1, 2 and 3, the cooling drag reduction system 105 optionally includes a state of charge sensor 117 electrically coupled to a battery 125 of the vehicle 100. In the embodiments described herein, the battery 125 provides power to the various electrical systems and devices of the vehicle 100. For example, and without limitation, the battery 125 may be electrically coupled to the cooling fan 114, such that the battery 125 provides electrical power capable of rotating the cooling fan 114. In some embodiments, the battery 125 is electrically coupled to and is used to supply electric power to an internal combustion engine (e.g., to a starter of the internal combustions engine), such as when the vehicle drive source 111 includes an internal combustion engine. In other embodiments, such as when the vehicle 100 is a hybrid vehicle or an electric vehicle, the battery 125 is electrically coupled to and provides electrical power to one or more electric motors of the vehicle drive source 111. In the embodiments described herein, the state of charge sensor 117 is communicatively coupled to the electronic control unit 116. The electronic control unit 116 is configured to receive signals from the state of charge sensor 117. Specifically, the state of charge sensor 117 detects the battery charge present in the battery 125 and outputs a signal indicative of the battery charge to the electronic control unit 116. In embodiments, the electronic control unit 116 selectively controls the rotation of the cooling fan 114 based on the signal received from the state of charge sensor 117 and a predetermined battery charge value, as will be described in further detail herein.

The cooling drag reduction system 105 of the vehicle 100 is communicatively coupled to an air conditioning system 118. In the embodiments described herein, the air conditioning system 118 includes an air conditioning compressor 119 and an air conditioning condenser 120. The air conditioning compressor 119 is in fluid communication with the air conditioning condenser 120, and pumps a refrigerant (not depicted) through the air conditioning condenser 120 to lower the temperature of the refrigerant. The refrigerant is used to provide cooled air to a cabin of the vehicle 100. The air conditioning compressor 119 may be selectively engaged to pump refrigerant through the air conditioning condenser 120. When disengaged, the air conditioning compressor 119 does not pump refrigerant through the air conditioning condenser 120. In embodiments, the air conditioning system 118 may be engaged by actuating a clutch coupled to the air conditioning compressor 119 which couples the air conditioning compressor 119 to a mechanical drive source, thereby providing mechanical power to the air conditioning compressor 119. When the air conditioning system 118 is engaged, one or more fans of the air conditioning system 118 may also be engaged to direct cool air from the air conditioning system 118 into the cabin of the vehicle 100.

In the embodiments described herein, the electronic control unit 116 of the cooling drag reduction system 105 is communicatively coupled to the air conditioning system 118, and monitors a state of engagement of the air conditioning system 118. For example, the electronic control unit 116 may monitor whether the clutch coupled to the air conditioning compressor 119 is engaged, and/or whether the fans of the air conditioning system 118 are switched on, each of which may indicate that the air conditioning compressor 119 is engaged, and thus the air conditioning system 118 is engaged. Accordingly, it should be understood that the electronic control unit 116 detects a state of engagement (i.e., engaged or disengaged) of the air conditioning compressor 119, and thus the state of engagement of the air conditioning system 118.

In some embodiments the electronic control unit 116 may control the engagement/disengagement of the air conditioning compressor 119. The electronic control unit 116 may be configured to receive a user input to engage the air conditioning system 118, and the electronic control unit 116 may command the clutch to engage the air conditioning compressor 119 to engage the air conditioning compressor 119. Accordingly, the electronic control unit 116 may detect the engagement of the air conditioning system 118 by detecting a user input. However, other methods for determining a state of engagement of the air conditioning system 118 are contemplated. In embodiments, the electronic control unit 116 selectively controls the rotation of the cooling fan 114 based on the state of engagement of the air conditioning system 118, as will be described in further detail herein.

In some embodiments, the cooling drag reduction system 105 may optionally include a vehicle speed sensor 121. The vehicle speed sensor 121 is configured to detect the speed of the vehicle 100. The vehicle speed sensor 121 is communicatively coupled to the electronic control unit 116, and is configured to send signals to the electronic control unit 116 indicative of the speed of the vehicle 100. In the embodiment shown in FIGS. 1, 2, and 3, the vehicle speed sensor 121 is configured to detect the speed of the vehicle 100 by sensing a rotational speed of a wheel 122 of the vehicle 100. While the vehicle speed sensor 121 in the embodiment shown in FIG. 1 is configured to sense the speed of the vehicle 100 by sensing the rotational speed of the wheel 122, it should be understood that other embodiments are contemplated. For example, in an alternative embodiment (not depicted), the vehicle speed sensor 121 may be operatively coupled to a driveshaft (not depicted) of the vehicle 100 and configured to detect the vehicle speed of the vehicle 100 by sensing the rotational speed of the driveshaft. Alternatively, the vehicle speed sensor 121 may be used to detect the revolutions per minute (RPM) of the vehicle drive source 111, which the electronic control unit 116 utilizes, along with a selected gear ratio of the transmission (not depicted), to detect the vehicle speed of the vehicle 100. In embodiments, the electronic control unit 116 selectively controls the rotation of the cooling fan 114 based on the signal received from the vehicle speed sensor 121 and a predetermined vehicle speed, as will be described in further detail herein.

In some embodiments, the cooling drag reduction system 105 may optionally include an engine temperature sensor 124. For example, the vehicle 100 may include a radiator assembly 123. The radiator assembly 123 is in fluid communication with the vehicle drive source 111, such as when the vehicle drive source 111 includes an internal combustion engine, and assists in cooling the internal combustion engine during operation of the vehicle 100. An engine coolant (not depicted) is pumped through cooling passages of the internal combustion engine such that the engine coolant absorbs heat from the internal combustion engine. The engine coolant is then pumped to the radiator assembly 123. The radiator assembly 123 dissipates heat from the engine coolant utilizing a plurality of cooling fins (not depicted). The engine temperature sensor 124 is coupled to the radiator assembly 123 such that the engine temperature sensor 124 detects a temperature of the engine coolant received from the internal combustion engine, thereby detecting a temperature of the internal combustion engine. The engine temperature sensor 124 is also communicatively coupled to the electronic control unit 116 and sends signals to the electronic control unit 116 indicative of the temperature of the internal combustion engine. In embodiments, the electronic control unit 116 selectively controls the rotation of the cooling fan based on the signal received from the engine temperature sensor 124 and a predetermined engine temperature, as will be described in further detail herein.

Figure 4:
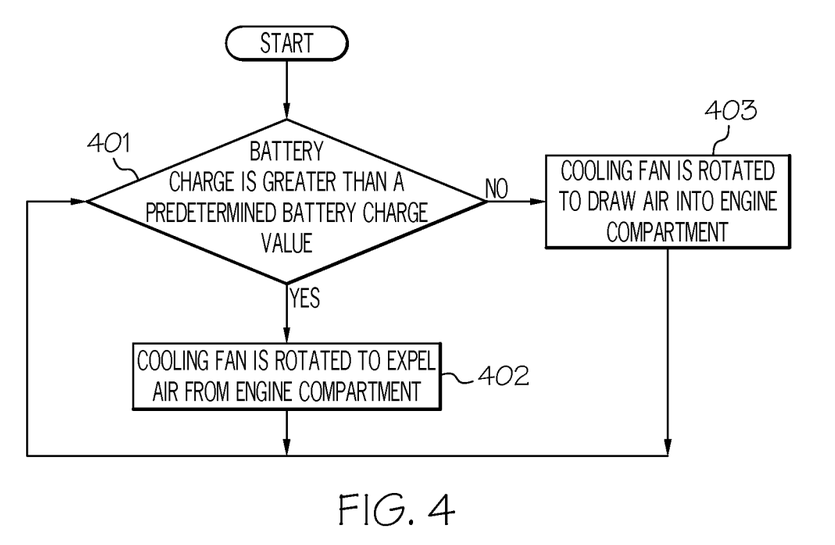
FIG. 4 is a logic flowchart of a method for operating a cooling fan, according to one or more of the embodiments shown and described herein.

Turning now to FIGS. 1, 2, and 4, one embodiment of a method of operating the cooling drag reduction system 105 is depicted in the flow chart of FIG. 4. The cooling fan 114 is selectively rotated in a direction to draw air through the front facie 112 into the engine compartment 110 (i.e., as shown in FIG. 1), or selectively rotated in a direction to expel air from the engine compartment 110 out through the front facie 112 (i.e., as shown in FIG. 2) according to the flowchart depicted in FIG. 4. In a first step 401, the electronic control unit 116 receives a signal from the state of charge sensor 117 indicating a detected battery charge stored in the battery 125 and compares this battery charge to the predetermined battery charge value. If the signal received by the electronic control unit 116 indicates a battery charge that is greater than the predetermined battery charge value, then at step 402 the electronic control unit 116 commands the cooling fan 114 to rotate in a direction to expel air from the engine compartment 110. If the signal received by the electronic control unit 116 indicates a battery charge that is not greater than the predetermined battery charge value, then at step 403, the electronic control unit 116 commands the cooling fan 114 to rotate (or continue rotating) in the direction to draw air into the engine compartment 110.

As noted above, the battery 125 is electrically coupled to the cooling fan 114, and may be electrically coupled to an internal combustion engine of the vehicle drive source 111 and various electronic devices of the vehicle 100. The battery 125 may also be electrically coupled to an electric motor of the vehicle drive source 111 when the vehicle 100 is a hybrid or electric vehicle. When the cooling fan 114 is rotated to expel air from the engine compartment 110, the cooling fan 114 is counteracting a force of the second portion 202 of the air stream 200. When the cooling fan 114 is rotated to draw air into the engine compartment 110, the cooling fan 114 is acting with the force of the second portion 202 of the air stream 200. Accordingly, when the cooling fan 114 is being utilized to reduce cooling drag by rotating to expel air from the engine compartment 110, the cooling fan 114 draws more power from the battery 125 than the cooling fan 114 draws from the battery 125 when rotating to draw air into the engine compartment 110. If the battery 125 does not have sufficient charge, the increased power drawn from the battery 125 by rotating the cooling fan 114 to expel air from the engine compartment 110 may reduce the ability of the battery 125 to supply electrical power to the internal combustion engine and/or electric motor of vehicle drive source 111, and various electronic devices of the vehicle 100. Accordingly, the predetermined battery charge value may be set at a value so as to ensure sufficient charge remains for the battery 125 to perform other functions if the cooling fan 114 is rotated in a direction to expel air from the engine compartment 110. By selecting the direction of rotation of the cooling fan 114 based on the amount of charge in the battery, the cooling drag reduction system 105 may operate without interfering with the ability of the battery 125 to provide sufficient electrical power to other components of the vehicle. For example, in some embodiments, the predetermined battery charge value may be about 90% of the maximum charge rating of the battery. In some other embodiments, the predetermined battery charge value may be about 85% of the maximum charge rating of the battery. In yet other embodiments, the predetermined battery charge value may be between from about 75% to about 90% of the maximum charge rating of the battery, inclusive of the end points.

Figure 5:
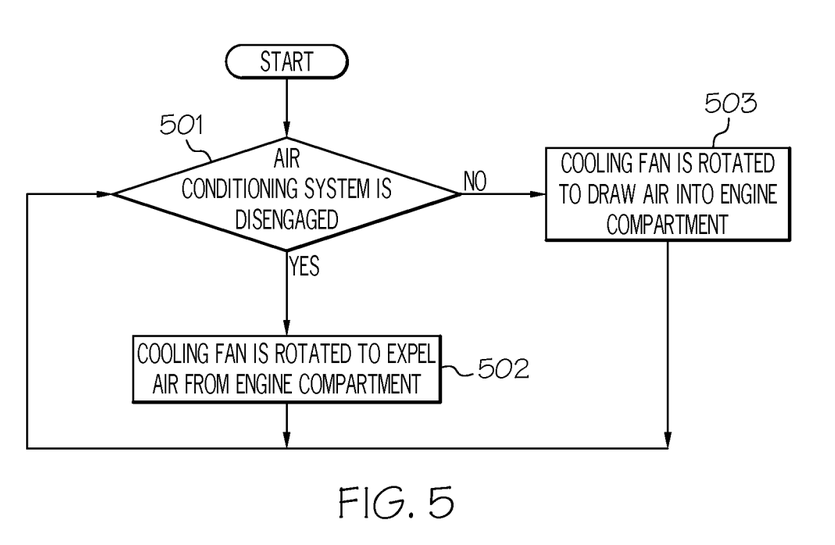
FIG. 5 is a logic flowchart of a method for operating a cooling fan, according to one or more of the embodiments shown and described herein.

Turning now to FIGS. 1, 2 and 5, another embodiment of a method for controlling the cooling drag reduction system is depicted in the flow chart of FIG. 5. The cooling fan 114 is selectively rotated in a direction to draw air through the front facie 112 into the engine compartment 110 (i.e., as shown in FIG. 1), or selectively rotated in a direction to expel air from the engine compartment 110 out through the front facie 112 (i.e., as shown in FIG. 2) according to the flowchart depicted in FIG. 5. In a first step 501, the electronic control unit 116 detects a state of engagement of the air conditioning system 118. For example, the electronic control unit 116 may detect if the air conditioning compressor 119 is engaged and/or if a user inputs a signal to engage the air conditioning system 118. If the electronic control unit 116 detects that the air conditioning system 118 is disengaged, then at step 502 the electronic control unit 116 commands the cooling fan 114 to rotate in a direction to expel air from the engine compartment 110. If the electronic control unit 116 detects that the air conditioning system 118 is not disengaged, then at step 503, the electronic control unit 116 commands the cooling fan 114 to rotate (or continue rotating) in the direction to draw air into the engine compartment 110.

As noted above, the air conditioning system 118 includes an air conditioning compressor 119 and an air conditioning condenser 120. When the air conditioning system 118 is engaged, the air conditioning compressor 119 is engaged and pumps the refrigerant through the air conditioning condenser 120 to cool the refrigerant. Conversely, when the air conditioning system 118 is disengaged, the air conditioning compressor 119 is disengaged. As shown in FIGS. 1 and 2, the air conditioning condenser 120 may be housed within the engine compartment 110 adjacent to the front facie 112 and cooling fan 114. The refrigerant in the air conditioning condenser 120 is cooled by air passing across the air conditioning condenser 120 from the outside of the vehicle 100 into the engine compartment 110. As noted above, when the cooling fan 114 is rotated to expel air from the engine compartment 110, as shown in FIG. 2, the airflow through the front facie 112 of the vehicle 100 and into the engine compartment 110, and thus across the air conditioning condenser 120, is reduced. Accordingly, the effectiveness of the air conditioning condenser 120 in cooling the refrigerant is reduced when the cooling fan 114 is rotated to expel air from the engine compartment 110, which may require increased power to be directed to the air conditioning compressor 119 to cool the refrigerant. Conversely, rotating the cooling fan 114 to draw air into the engine compartment 110, as shown in FIG. 1, the cooling fan 114 provides greater air flow across the air conditioning condenser 120, assisting in cooling the refrigerant in the air conditioning condenser 120. By selecting the direction of rotation of the cooling fan 114 based on the detected state of engagement of the air conditioning system 118, the cooling drag reduction system 105 does not reduce the efficiency of the air conditioning system 118.

Figure 6:
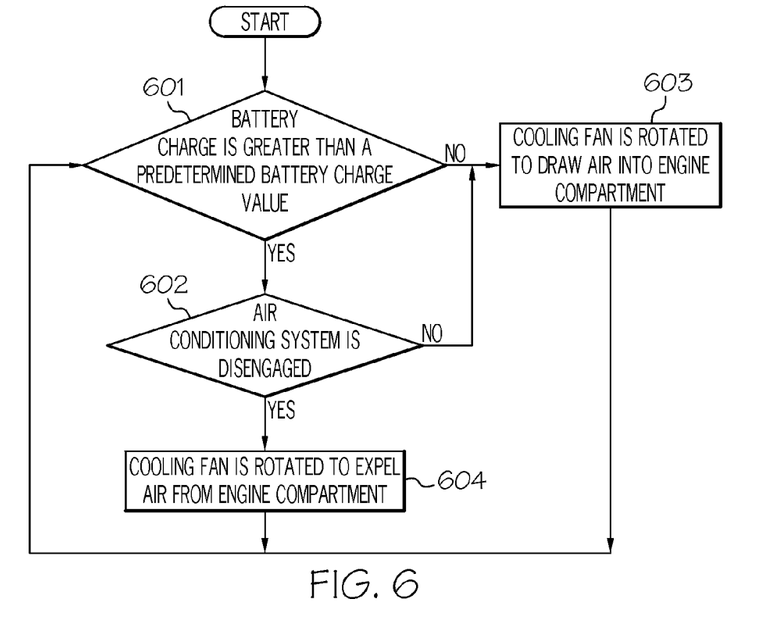
FIG. 6 is a logic flowchart of a method for operating a cooling fan, according to one or more of the embodiments shown and described herein.

Turning now to FIGS. 1, 2, and 6, another embodiment of a method for operating the cooling drag reduction system 105 is depicted in the flow chart of FIG. 6. The cooling fan 114 is selectively rotated in a direction to draw air through the front facie 112 into the engine compartment 110 (i.e., as shown in FIG. 1), or selectively rotated in a direction to expel air from the engine compartment 110 out through the front facie 112 (i.e., as shown in FIG. 2) according to the flowchart depicted in FIG. 6. In a first step 601, the electronic control unit 116 receives a signal from the state of charge sensor 117 indicating battery charge stored in the battery 125 and compares this battery charge to the predetermined battery charge value. If the signal received by the electronic control unit 116 indicates a battery charge that is greater than the predetermined battery charge value, then the electronic control unit 116 proceeds to step 602. If the signal received by the electronic control unit 116 indicates a battery charge that is not greater than the predetermined battery charge value, then at step 603, the electronic control unit 116 commands the cooling fan 114 to rotate (or continue rotating) in the direction to draw air into the engine compartment 110. At step 602, the electronic control unit 116 detects a state of engagement of the air conditioning system 118. If the electronic control unit 116 detects that the air conditioning system 118 is disengaged, then at step 604 the electronic control unit 116 commands the cooling fan 114 to rotate in a direction to expel air from the engine compartment 110. If the electronic control unit 116 detects that the air conditioning system 118 not disengaged, then at step 603, the electronic control unit 116 commands the cooling fan 114 to rotate (or continue rotating) in the direction to draw air into the engine compartment 110.

In the embodiment of the method for operating the cooling drag reduction system depicted in the flow chart of FIG. 6, the step of detecting a battery charge and comparing that battery charge to a predetermined battery charge value (i.e., step 601) is performed before the step of determining the state of engagement of the air conditioning system (i.e., step 602). However, it should be understand that these steps may be performed in any order (i.e., step 602 may be performed before step 601) or even simultaneously.

Figure 7:
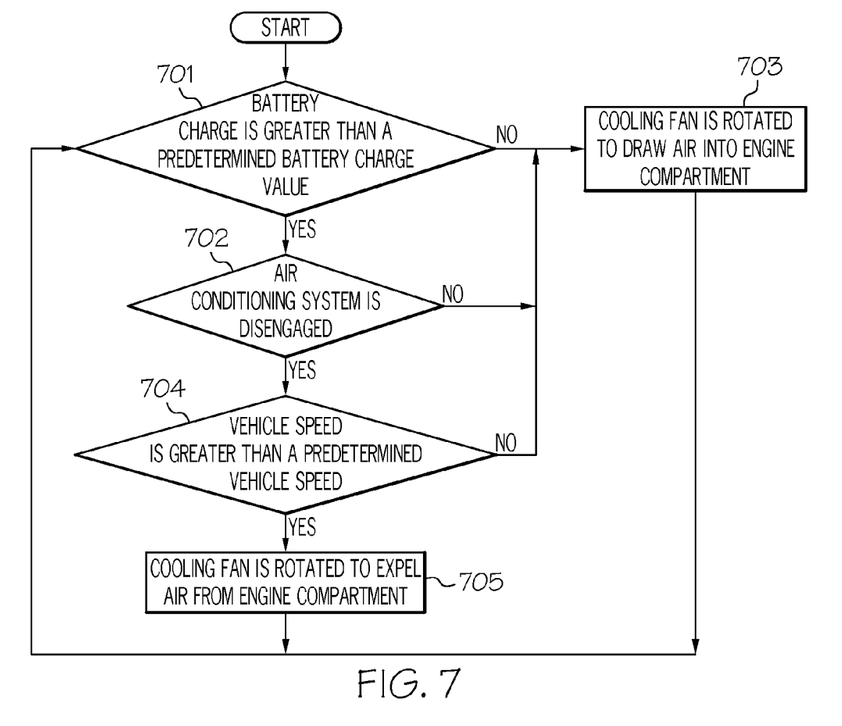
FIG. 7 is a logic flowchart of a method for operating a cooling fan, according to one or more of the embodiments shown and described herein.

Turning now to FIGS. 1, 2, and 7, another embodiment of a method for operating the cooling drag reduction system 105 is depicted in the flow chart of FIG. 7. The cooling fan 114 is selectively rotated in a direction to draw air through the front facie 112 into the engine compartment 110 (i.e., as shown in FIG. 1), or selectively rotated in a direction to expel air from the engine compartment 110 out through the front facie 112 (i.e., as shown in FIG. 2) according to the flowchart depicted in FIG. 7. In a first step 701, the electronic control unit 116 receives a signal from the state of charge sensor 117 indicating a battery charge stored in the battery 125 and compares this battery charge to the predetermined battery charge value. If the signal received by the electronic control unit 116 indicates a battery charge that is greater than the predetermined battery charge value, then the electronic control unit 116 proceeds to step 702. If the signal received by the electronic control unit 116 indicates a battery charge that is not greater than the predetermined battery charge value, then the electronic controller proceeds to step 703, where the electronic control unit 116 commands the cooling fan 114 to rotate (or continue rotating) in the direction to draw air into the engine compartment 110. At step 702, the electronic control unit 116 detects a state of engagement of the air conditioning system 118. If the electronic control unit 116 detects that the air conditioning system 118 is disengaged, then the electronic control unit 116 proceeds to step 704. If the electronic control unit 116 detects that the air conditioning system 118 is not disengaged, then the electronic control unit 116 proceeds to step 703, where the electronic control unit 116 commands the cooling fan 114 to rotate (or continue rotating) in the direction to draw air into the engine compartment 110. At step 704, the electronic control unit 116 receives a signal from the vehicle speed sensor 121, the signal from the vehicle speed sensor 121 indicating a detected vehicle speed. If the electronic control unit 116 receives a signal indicating a vehicle speed that is greater than the predetermined vehicle speed, then at step 705 the electronic control unit 116 commands the cooling fan 114 to rotate in a direction to expel air from the engine compartment 110. If the electronic control unit 116 receives a signal indicating a vehicle speed that is not greater than the predetermined vehicle speed, then the electronic control unit 116 proceeds to step 703, where the electronic control unit 116 commands the cooling fan 114 to rotate (or continue rotating) in the direction to draw air into the engine compartment 110.

In the embodiment of the method for operating the cooling drag reduction system depicted in the flow chart of FIG. 7, the steps of determining a battery charge of the battery and comparing the battery charge to a predetermined battery charge value (i.e., step 701), the step of determining the state of engagement of the air conditioning system (i.e., step 702), and the step of detecting a vehicle speed of the vehicle and comparing the vehicle speed to the predetermined vehicle speed (i.e., step 704) are depicted and described in a specific order. However, it should be understand that these steps may be performed in any order (i.e., step 702 may be performed before step 701, etc.) or even simultaneously.

As noted above, and shown in FIGS. 1 and 2, the air stream 200 flows over the vehicle 100, and the second portion 202 of the air stream 200 flows through the front facie 112 of the vehicle 100. The speed of the vehicle 100 is proportional to the volume of airflow of the second portion 202 of the air stream 200 that flows through the front facie 112 of the vehicle 100. As the vehicle speed of the vehicle 100 increases, the volume of airflow of the second portion 202 of the air stream 200 that flows through the front facie 112 of the vehicle 100 increases, and consequently the volume of airflow across the air conditioning condenser 120 and the volume of airflow across the radiator assembly 123 increases. Conversely, as the speed of the vehicle 100 decreases, the volume of airflow of the second portion 202 of the air stream 200 that flows through the front facie 112 of the vehicle 100 decreases, and consequently the volume of airflow across the air conditioning condenser 120 and the volume of airflow across the radiator assembly 123 decreases. As discussed above, increased airflow across the air conditioning condenser 120 increases the efficiency of the air conditioning system 118 when the air conditioning system 118 is engaged. Also, as discussed further below, the greater the volume of airflow across the radiator assembly 123, the more heat is dissipated from the internal combustion engine, when the vehicle drive source 111 includes an internal combustion engine. Accordingly, the predetermined vehicle speed may be selected so as to ensure sufficient air flow to support the air conditioning system 118 and radiator assembly 123 function. By determining the direction of rotation of the cooling fan 114 based on the vehicle speed, the cooling drag reduction system 105 may reduce cooling drag without compromising the efficiency of the air conditioning system 118 or the cooling of the internal combustion engine, when the vehicle drive source 111 includes an internal combustion engine. For example, the predetermined vehicle speed may be selected to be about 80 km/h in one embodiment. In another embodiment, the predetermined vehicle speed may be about 60 km/h. In yet another embodiment, the predetermined vehicle speed may be selected between about 50 km/h and about 80 km/h inclusive of the endpoints.

Figure 8:
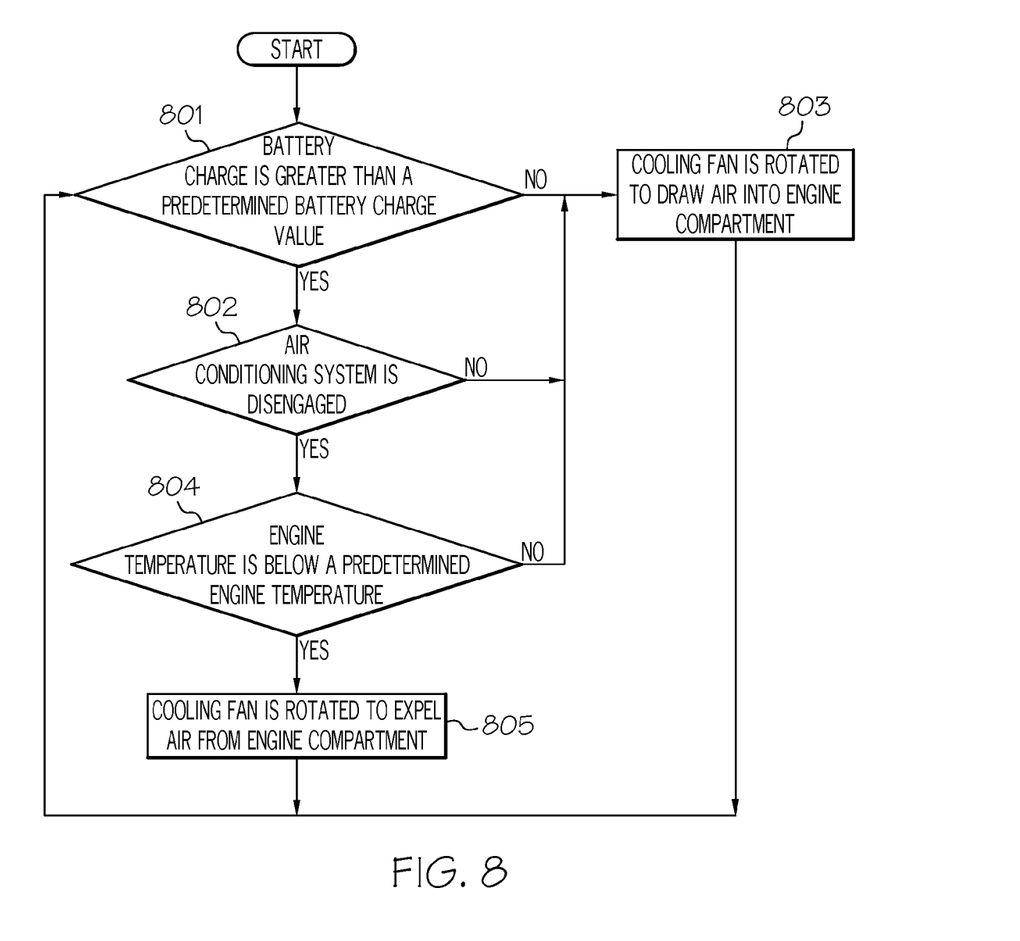
FIG. 8 is a logic flowchart of a method for operating a cooling fan, according to one or more of the embodiments shown and described herein.

Turning now to FIGS. 1, 2, and 8, another embodiment of a method for operating the cooling drag reduction system 105 is depicted in the flow chart of FIG. 8. The cooling fan 114 is selectively rotated in a direction to draw air through the front facie 112 into the engine compartment 110 (i.e., as shown in FIG. 1), or selectively rotated in a direction to expel air from the engine compartment 110 out through the front facie 112 (i.e., as shown in FIG. 2) according to the flowchart depicted in FIG. 8. In a first step 801, the electronic control unit 116 receives a signal from the state of charge sensor 117 indicating a battery charge stored in the battery and compares this battery charge to the predetermined battery charge value. If the signal received by the electronic control unit 116 indicates a battery charge that is greater than the predetermined battery charge value, then the electronic control unit 116 proceeds to step 802. If the signal received by the electronic control unit 116 indicates a battery charge that is not greater than the predetermined battery charge value, then the electronic controller proceeds to step 803, where the electronic control unit 116 commands the cooling fan 114 to rotate (or continue rotating) in the direction to draw air into the engine compartment 110. At step 802, the electronic control unit 116 detects a state of engagement of the air conditioning system 118. If the electronic control unit 116 detects that the air conditioning system 118 is disengaged, then the electronic control unit 116 proceeds to step 804. If the electronic control unit 116 detects that the air conditioning system 118 is not disengaged, then the electronic control unit 116 proceeds to step 803, where the electronic control unit 116 commands the cooling fan 114 to rotate (or continue rotating) in the direction to draw air into the engine compartment 110. At step 804, the electronic control unit receives a signal from the engine temperature sensor 124, the signal indicating a detected engine temperature. If the electronic control unit 116 receives a signal indicating an engine temperature below the predetermined engine temperature, then at step 805 the electronic control unit 116 commands the cooling fan 114 to rotate in a direction to expel air from the engine compartment 110. If the electronic control unit 116 receives a signal indicating an engine temperature not below the predetermined engine temperature, then the electronic control unit proceeds to step 803 where the electronic control unit 116 commands the cooling fan 114 to rotate (or continue rotating) in the direction to draw air into the engine compartment 110.

In the embodiment of the method for operating the cooling drag reduction system depicted in the flow chart of FIG. 8, the steps of determining a state of charge of the battery and comparing that state of charge to a predetermined battery charge value (i.e., step 801), the step of determining the state of engagement of the air conditioning system (i.e., step 802), and the step of detecting an engine temperature and comparing the engine temperature to the predetermined engine temperature (i.e., step 804) are depicted and described in a specific order. However, it should be understood that these steps may be performed in any order (i.e., step 802 may be performed before step 801, etc.) or even simultaneously.

As noted above, the engine temperature sensor 124 is part of the radiator assembly 123, which assists in cooling the vehicle drive source 111, when the vehicle drive source includes an internal combustion engine. As shown in FIGS. 1 and 2, the radiator assembly 123 may be housed within the engine compartment 110 adjacent to the front facie 112 and cooling fan 114. The engine coolant in the radiator assembly 123 is cooled by air passing across the radiator assembly 123 from the outside of the vehicle 100 into the engine compartment 110. As noted above, when the cooling fan 114 is rotated to expel air from the engine compartment 110, the airflow through the front facie of the vehicle 100 and across the radiator assembly 123 into the engine compartment 110 is reduced. Accordingly, the effectiveness of the radiator assembly 123 in dissipating heat from the engine coolant is reduced when the cooling fan 114 is rotated to expel air from the engine compartment 110. As the engine coolant dissipates less heat, the radiator assembly 123 becomes less effective at cooling the vehicle drive source 111, when the vehicle drive source 111 includes an internal combustion engine. Conversely, rotating the cooling fan 114 to draw air into the engine compartment 110 provides greater air flow across the radiator assembly 123, assisting in reducing the temperature of the engine coolant, and assisting in cooling the vehicle drive source 111, when the vehicle drive source 111 includes an internal combustion engine. Accordingly, the predetermined engine temperature may be selected so as to ensure that the vehicle drive source 111 is being sufficiently cooled. By selecting the direction of rotation of the cooling fan 114 based on the engine temperature, the cooling drag reduction system 105 may operate so as to ensure that an internal combustion engine of the vehicle drive source 111 does not overheat. For example, in one embodiment, the predetermined engine temperature may be 220° F. In another embodiment, the predetermined engine temperature may be 200° F. In yet another embodiment the predetermined engine temperature may be anywhere between 180° F. and 220° F., inclusive of the endpoints.

Figure 9:
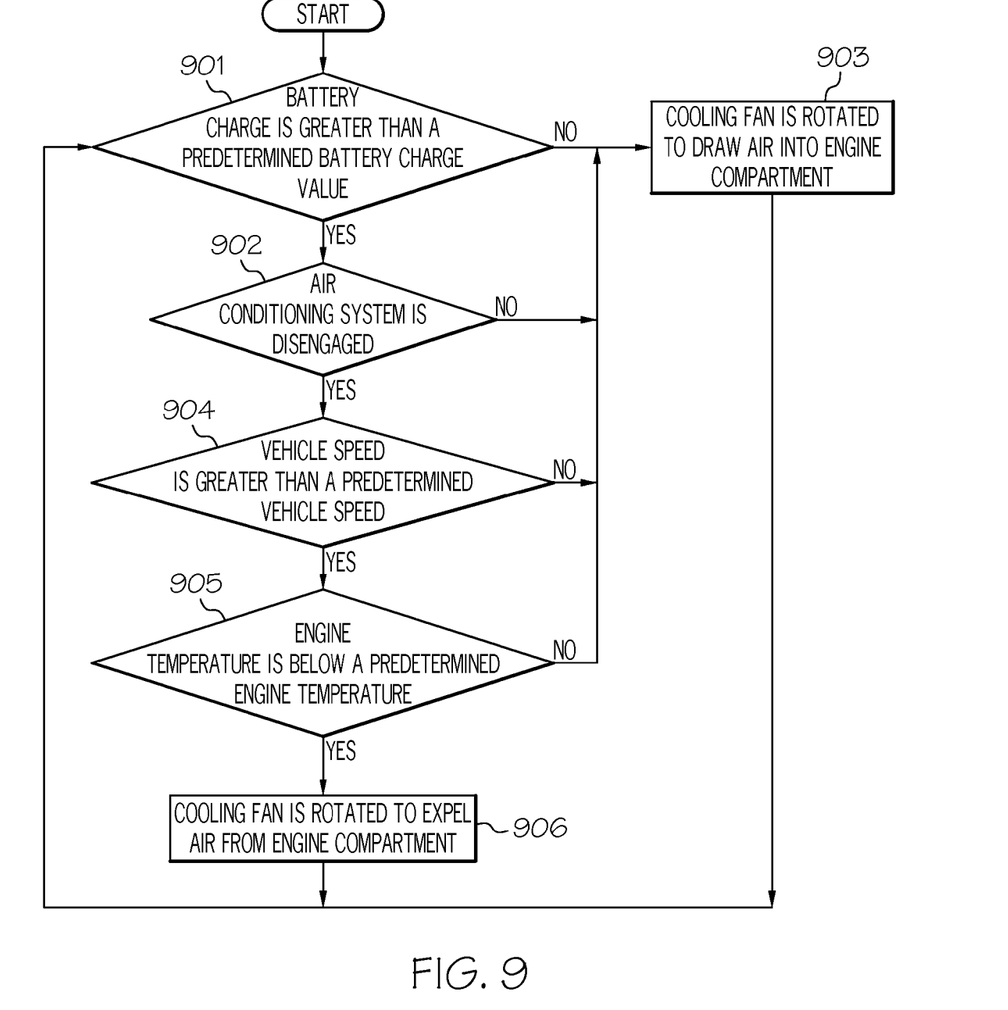
FIG. 9 is a logic flowchart of a method for operating a cooling fan, according to one or more of the embodiments shown and described herein.

Turning now to FIGS. 1, 2, and 9, another embodiment of a method for operating the cooling drag reduction system 105 is depicted in the flow chart of FIG. 9. The cooling fan 114 is selectively rotated in a direction to draw air through the front facie 112 into the engine compartment 110 (i.e., as shown in FIG. 1), or selectively rotated in a direction to expel air from the engine compartment 110 out through the front facie 112 (i.e., as shown in FIG. 2) according to the flowchart depicted in FIG. 9. In a first step 901, the electronic control unit 116 receives a signal from the state of charge sensor 117 indicating a battery charge stored in the battery and compares this battery charge to the predetermined battery charge value. If the signal received by the electronic control unit 116 indicates a battery charge that is greater than the predetermined battery charge value, then the electronic control unit 116 proceeds to step 902. If the signal received by the electronic control unit 116 indicates a battery charge that is not greater than the predetermined battery charge value, then the electronic controller proceeds to step 903, where the electronic control unit 116 commands the cooling fan 114 to rotate (or continue rotating) in the direction to draw air into the engine compartment 110. At step 902, the electronic control unit 116 detects a state of engagement of the air conditioning system 118. If the electronic control unit 116 detects that the air conditioning system 118 is disengaged, then the electronic control unit 116 proceeds to step 904. If the electronic control unit 116 detects that the air conditioning system 118 is not disengaged, then the electronic control unit 116 proceeds to step 903, where the electronic control unit 116 commands the cooling fan 114 to rotate (or continue rotating) in the direction to draw air into the engine compartment 110. At step 904, the electronic control unit 116 receives a signal from the vehicle speed sensor 121, the signal from the vehicle speed sensor 121 indicating a vehicle speed. If the electronic control unit 116 receives a signal indicating a vehicle speed that is greater than the predetermined vehicle speed, then the electronic control unit 116 proceeds to step 905. If the electronic control unit 116 receives a signal indicating a vehicle speed that is not greater than the predetermined vehicle speed, then the electronic control unit 116 proceeds to step 903 where the electronic control unit 116 commands the cooling fan 114 to rotate (or continue rotating) in the direction to draw air into the engine compartment 110. At step 905, the electronic control unit 116 receives a signal from the engine temperature sensor 124, the signal indicating an engine temperature. If the electronic control unit 116 receives a signal indicating an engine temperature below the predetermined engine temperature, then at step 906 the electronic control unit 116 commands the cooling fan 114 to rotate in a direction to expel air from the engine compartment 110. If the electronic control unit 116 receives a signal indicating an engine temperature not below the predetermined engine temperature, then the electronic control unit proceeds to step 903 where the electronic control unit 116 commands the cooling fan 114 to rotate (or continue rotating) in the direction to draw air into the engine compartment 110.

In the embodiment of the method for operating the cooling drag reduction system depicted in the flow chart of FIG. 9, the steps of determining a state of charge of the battery and comparing that state of charge to a predetermined battery charge value (i.e., step 901), the step of determining the state of engagement of the air conditioning system (i.e., step 902), the step of detecting a vehicle speed of the vehicle and comparing the vehicle speed to the predetermined vehicle speed (i.e., step 904), and the step of detecting an engine temperature and comparing the engine temperature to the predetermined engine temperature (i.e., step 905) are depicted and described in a specific order. However, it should be understand that these steps may be performed in any order (i.e., step 902 may be performed before step 901, etc.) or even simultaneously.

As noted above, the cooling drag reduction system 105 operates to reduce cooling drag on the vehicle 100. The cooling drag reduction system 105 operates by rotating a cooling fan 114 to expel air from an engine compartment. Expelling air from the engine compartment may reduce the efficiency or compromise the function of several systems and elements of the vehicle 100, including electrical power/battery function, the efficiency of the air conditioning system, and the cooling of the vehicle drive source when the vehicle drive source includes an internal combustion engine. However, the cooling drag reduction system 105 is selectively engaged to maintain the function of other systems and functions of the vehicle 100, including maintaining sufficient battery charge, maintaining efficient air conditioning system function, and maintaining proper cooling of the vehicle drive source when the vehicle drive source includes an internal combustion engine.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for operating a vehicle comprising a state of charge sensor, an air conditioning system, and a cooling fan, the method comprising:
   detecting at least one of a battery charge of a battery of the vehicle with the state of charge sensor and a state of engagement of the air conditioning system of the vehicle;
   rotating the cooling fan in a direction to expel air from an engine compartment of the vehicle based on at least one of a detected battery charge of the battery or a detected state of engagement of the air conditioning system; and
   rotating the cooling fan in a direction to draw air into the engine compartment when the detected state of charge of the battery is below a predetermined threshold.

2. The method of claim 1, wherein the cooling fan is rotated in the direction to expel air from the engine compartment of the vehicle when the detected battery charge of the battery is greater than a predetermined battery charge value.

3. The method of claim 1, wherein the cooling fan is rotated in the direction to expel air from the engine compartment of the vehicle when the air conditioning system is disengaged.

4. The method of claim 1, wherein the cooling fan is rotated in the direction to expel air from the engine compartment of the vehicle when the detected battery charge of the battery is greater than a predetermined battery charge value and the air conditioning system is disengaged.

5. The method of claim 1 further comprising detecting a vehicle speed of the vehicle, wherein the cooling fan is rotated in the direction to expel air from the engine compartment of the vehicle based on a detected vehicle speed of the vehicle, and at least one of the detected battery charge of the battery or the detected state of engagement of the air conditioning system.

6. The method of claim 5, wherein the cooling fan is rotated in the direction to expel air from the engine compartment of the vehicle when the detected vehicle speed is greater than a predetermined vehicle speed.

7. The method of claim 1 further comprising detecting an engine temperature, wherein the cooling fan is rotated in the direction to expel air from the engine compartment of the vehicle based on a detected engine temperature, and at least one of the detected battery charge of the battery or the detected state of engagement of the air conditioning system.

8. A cooling drag reduction system for a vehicle comprising:
   an electronic controller comprising a processor and a memory storing a computer readable and executable instruction set;
   a state of charge sensor communicatively coupled to the electronic controller;
   an air conditioning system communicatively coupled to the electronic controller;
   a cooling fan communicatively coupled to the electronic controller, wherein, when the computer readable and executable instruction set is executed by the processor, the electronic controller:
      detects at least one of a battery charge of a battery of the vehicle with the state of charge sensor and a state of engagement of the air conditioning system of the vehicle;
      commands the cooling fan to rotate in a direction to expel air from an engine compartment of the vehicle based on at least one of a detected battery charge of the battery or a detected state of engagement of the air conditioning system; and
      commands the cooling fan to rotate in a direction to draw air into the engine compartment if the detected state of charge of the battery is below a predetermined threshold.

9. The cooling drag reduction system of claim 8, wherein the electronic controller commands the cooling fan to rotate in the direction to expel air from the engine compartment of the vehicle when the detected battery charge of the battery is greater than a predetermined battery charge value.

10. The cooling drag reduction system of claim 8, wherein the electronic controller commands the cooling fan to rotate in the direction to expel air from the engine compartment of the vehicle when the air conditioning system is disengaged.

11. The cooling drag reduction system of claim 8, wherein the electronic controller commands the cooling fan to rotate in the direction to expel air from the engine compartment of the vehicle when the detected battery charge of the battery is greater than a predetermined battery charge value and the air conditioning system is disengaged.

12. The cooling drag reduction system of claim 8 further comprising a vehicle speed sensor communicatively coupled to the electronic controller, wherein the electronic controller further detects a vehicle speed of the vehicle and commands the cooling fan to rotate in the direction to expel air from the engine compartment of the vehicle based on a detected vehicle speed, and at least one of the detected battery charge of the battery, or the detected state of engagement of the air conditioning system.

13. The cooling drag reduction system of claim 12 wherein the electronic controller commands the cooling fan to rotate in the direction to expel air from the engine compartment of the vehicle when the detected vehicle speed is greater than a predetermined vehicle speed.

14. The cooling drag reduction system of claim 8 further comprising an engine temperature sensor communicatively coupled to the electronic controller, wherein the electronic controller further detects an engine temperature and commands the cooling fan to rotate in the direction to expel air from the engine compartment of the vehicle based on a detected engine temperature, and at least one of the detected battery charge of the battery or the detected state of engagement of the air conditioning system.

15. The cooling drag reduction system of claim 14 wherein the electronic controller commands the cooling fan to rotate in the direction to expel air from the engine compartment of the vehicle when the detected engine temperature is less than a predetermined engine temperature.

16. The cooling drag reduction system of claim 14 further comprising a vehicle speed sensor communicatively coupled to the electronic controller, wherein the electronic controller further detects a vehicle speed of the vehicle and commands the cooling fan to rotate in the direction to expel air from the engine compartment of the vehicle when the detected battery charge of the battery is greater than a predetermined battery charge value, the air conditioning system is disengaged, a detected vehicle speed is greater than a predetermined vehicle speed, and the detected engine temperature is less than a predetermined engine temperature.

17. A vehicle comprising:
an electronic controller comprising a processor and a memory storing a computer readable and executable instruction set;
a state of charge sensor communicatively coupled to the electronic controller;
an air conditioning system communicatively coupled to the electronic controller;
a cooling fan communicatively coupled to the electronic controller, wherein, when the computer readable and executable instruction set is executed by the processor, the electronic controller:
detects at least one of a battery charge of a battery of the vehicle with the state of charge sensor and a state of engagement of the air conditioning system of the vehicle;
commands the cooling fan to rotate in a direction to expel air from an engine compartment of the vehicle based on at least one of a detected battery charge of the battery or a detected state of engagement of the air conditioning system; and
commands the cooling fan to rotate in a direction to draw air into the engine compartment if the detected state of charge of the battery is below a predetermined threshold.

18. The vehicle of claim 17, wherein the electronic controller commands the cooling fan to rotate in the direction to expel air from an interior of the engine compartment of the vehicle when the detected battery charge of the battery is greater than a predetermined battery charge value and the air conditioning system is disengaged.

* * * * *